United States Patent

[11] 3,624,563

| [72] | Inventors | Henry E. Burley<br>Baltimore, Md.;<br>William H. Martin, Leesburg, Va. |
|---|---|---|
| [21] | Appl. No. | 838,999 |
| [22] | Filed | July 3, 1969 |
| [45] | Patented | Nov. 30, 1971 |
| [73] | Assignee | Westinghouse Electric Corporation<br>Pittsburgh, Pa. |

[54] COIL AND FIXED TAP INPUT COUPLING FOR VARIABLY END-LOADED COAXIAL FILTER, GIVING LINEAR Q WITH TUNING CHANGE, SUITABLE FOR MULTICOUPLER APPLICATIONS
7 Claims, 7 Drawing Figs.

[52] U.S. Cl. .................................................. 333/24 R,
333/73 C, 333/82 B
[51] Int. Cl. ...................................................... H03h 13/00,
H01p 7/04, H01p 5/04
[50] Field of Search ........................................... 333/82 B,
82 R, 73 C, 83 R, 73 R; 334/41–45, 65, 40;
325/459; 330/56

[56] References Cited
UNITED STATES PATENTS

| 3,252,096 | 5/1966 | Carlson ........................ | 333/82 X |
| 3,273,083 | 9/1966 | Rose.............................. | 333/73 |
| 3,308,403 | 3/1967 | Kubota et al. ................ | 334/65 |

OTHER REFERENCES

Matthaei et al., " Microwave Filters, Impedance-Matching Networks & Coupling Structures," McGraw Hill, 1964, pp. 1006–1020

Ragen, G. L., " Microwave Transmission Circuits," M.I.T. Radiation Lab. Series, Vol. 9, McGraw Hill, 1948, pp. 683–689

Harvard, " Very High-Frequency Techniques," Radio Research Lab. Harvard U., Vol. II, McGraw Hill, 1947 pp. 769–775

*Primary Examiner*—Herman Karl Saalbach
*Assistant Examiner*—Wm. H. Punter
*Attorneys*—F. H. Henson and E. P. Klipfel ABSTRACT: An input coupling for a multicoupler filter wherein the inner conductor of the input cavity is connected to a generator through a choke which is connected at one end to the generator and at the opposite end by a tap to the inner conductor of the cavity. The inductance magnitude of the choke and the position of the tap on the inner conductor are selected to provide a predetermined loaded Q of the cavity at one end of the frequency range of interest and to provide another predetermined loaded Q of the cavity at the opposite end of the frequency range of interest. The loaded Q of the cavity has been found to vary linearly over the frequency range of interest when the inductance magnitude of the choke and the position of the tap are determined in the aforementioned manner.

PATENTED NOV 30 1971 3,624,563

WITNESSES
Wm. B. Sellers
James H. Young

INVENTORS
Henry E. Burley and
William H. Martin
BY Ernest P. Klipfel
ATTORNEY

COIL AND FIXED TAP INPUT COUPLING FOR VARIABLY END-LOADED COAXIAL FILTER, GIVING LINEAR Q WITH TUNING CHANGE, SUITABLE FOR MULTICOUPLER APPLICATIONS

BACKGROUND OF THE INVENTION

1. Field of the Invention:

The present invention relates generally to VHF multicouplers and more particularly relates to an input coupling to the input cavity of a channel filter which may include a plurality of cavities.

2. Description of the Prior Art:

In the design of filters used in multicouplers for connecting a number of transmitters to a single antenna the filter has to be designed to have specific loaded Q characteristics in order to give specific out-of-band rejection characteristics and passband insertion loss characteristics. When the cavity of the filter becomes inordinately large, it is customary to foreshorten the cavity by increasing the capacity between the inner conductor and the end wall of the cavity. In order to couple the generator into the input cavity of a channel filter, an additional variable capacitor may be used to connect the input source to the inner conductor. At each frequency setting of the input cavity, the variable capacitor can be calibrated and set manually each time to obtain the required loaded Q. Otherwise the capacity between the inner conductor and the end wall of the cavity and the variable capacitor can be coupled together by a gearing system. When the input cavity is tuned to resonance, the variable capacitor follows the variance in capacity of the cavity in the correct relationship. In the latter circumstance it proves difficult if not impossible, to obtain accurate loaded Q tracking with frequency using linear capacitors and linear gear ratios. When using such system the tracking follows a substantially nonlinear relationship.

One solution, with many drawbacks, is to shape the variable capacitor in such a way that its magnitude varies in a nonlinear manner with frequency. Such an arrangement is overly complicated and much too intricate for a simple, inexpensive, reliable and maintainable multicoupler.

Another solution is as outlined by George L. Ragan in the Radiation Laboratory series, Volume 9, entitled "Microwave Transmission Circuits," 1948 by McGraw-Hill Book Co. Inc., pages 686–687, wherein the input line from the generator source extends into the cavity and is connected to the inner conductor of the cavity. However, as one raises the tap point of a direct-tapped cavity, one is simply tapping higher up a tuned circuit or placing a load across more and more of a tuned circuit. The effect is to seriously lower the loaded Q as the frequency is increased, for affixed tap position. The Q falls in some nonlinear fashion.

It is an object of the present invention to provide a capacity-loaded cavity wherein the coupling network establishes a specific loaded Q on the input cavity of a multiple pole filter at different frequencies to which the filter may be tuned without varying component values during tuning.

Another object of the present invention is to provide a coupling circuit for a multicoupler filter made up of a plurality of capacity-loaded cavities which only utilizes a choke and is therefore very reliable.

Another object of the present invention is to provide an input coupling for a cavity which provides a linear loaded Q versus frequency curve.

SUMMARY OF THE INVENTION

Briefly, the present invention accomplishes the above-cited objects and other objects and advantages by providing an input coupling loop for a capacity-loaded cavity utilizing a choke for connecting the generator source to the inner conductor of the cavity. The choke is connected to the inner conductor by a tap. The choke transforms the generator resistance to values of resistance at the hard tap to provide a compensating loading effect on the cavity across a frequency band to give a linear loaded Q versus frequency relationship.

BRIEF DESCRIPTION OF THE DRAWINGS

Further objects and advantages will be readily apparent from the following detailed description taken in conjunction with the drawings in which.

DESCRIPTION OF THE PREFERRED EMBODIMENT

Figure 1:
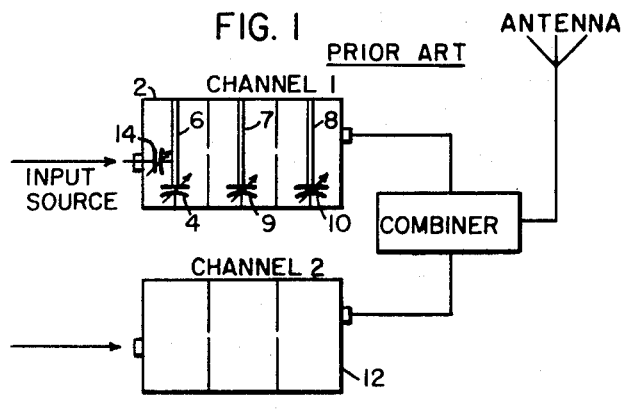
FIG. 1 is a schematic block diagram of a multicoupler in accordance with the prior art.

For a clearer understanding of the present invention further reference will be made to a prior art configuration as illustrated in FIG. 1. Two channels of a multichannel coupler are illustrated. An input cavity to the first channel has a main tuning capacitor 4 serially disposed with an inner conductor 6 in the input cavity 2. Similar main tuning capacitors 9 and 10 are illustrated in the cascaded plurality of similar tuned high-Q resonators. The second channel 12 has not been detailed but is similar to the channel filter made up of the aforementioned three similar cavities or resonators. Each of the cavities consists of a shortened length of transmission line 6, 7 and 8 capacitively loaded at 4, 9 and 10 respectively to obtain resonance across the wide range of frequencies. For illustrative purposes the frequency range of interest is identified as 30 to 76 MHz.

When the channel frequency is to be changed, the input cavity containing the capacitor 4 and an input variable capacitor 14 has to be set to have a specific loading Q with the other cavities detuned.

Figure 3:
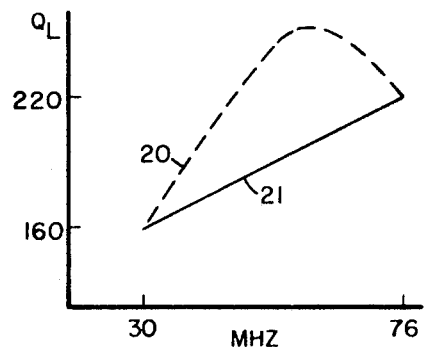
FIGS. 3–4 are graphical illustrations of loaded Q versus frequency relationships obtainable with prior art circuits as compared to the present invention.
Figure 4:
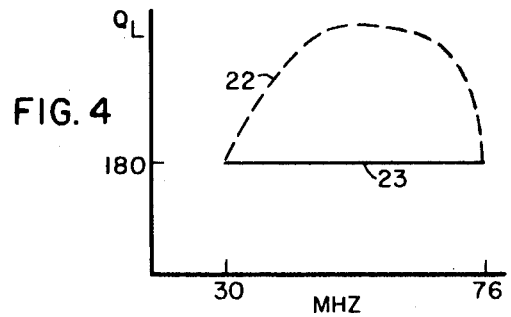

FIGS. 3–4 illustrate the loaded Q versus frequency relationship which occurs when practicing the prior art. The dotted lines 20 and 22 in FIGS. 3–4 respectively are typical responses obtained with linear capacitors 4 and 14 in the input cavity when driven by a linear gear system. Other prior art solutions shape a capacitor value so that its capacitance varies in a nonlinear method with frequency in an attempt to approach a desired linear relationship as shown by the solid line 21 and 23 in FIGS. 3–4 respectively.

In accordance with the present invention it was determined that a linear loaded Q versus frequency curve was desirable to give specific out-of-band rejection characteristics and passband insertion loss characteristics. It was found that the slope of the linear curve could also be varied as illustrated in FIGS. 3 and 4.

Figure 2:
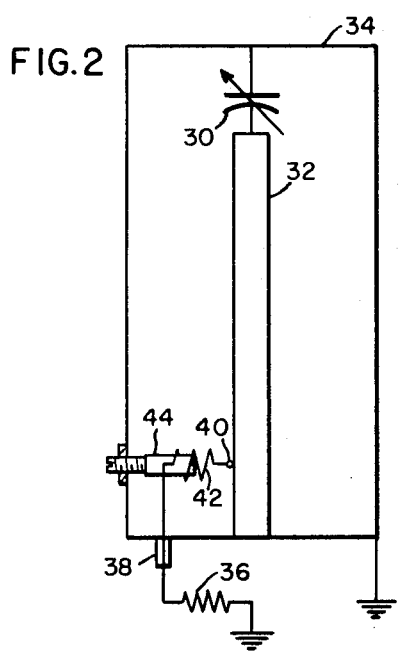
FIG. 2 is an illustrative embodiment of the present invention.

A substantially linear loaded Q versus frequency curve was actually obtained with the illustrative embodiment of FIG. 2. A main tuning capacitor 30 terminates an inner conductor 32 of the input cavity 34. A generator source 36 represented by a resistor $R_s$ is coupled into the cavity 34 via a coaxial fitting 38 and choke 42 to a tap point 40 on the inner conductor 32.

A Q relationship very close to that required was obtained by using the inductor 42 in series with a tap 40 to the inner conductor 32 as shown in FIG. 2. The cooperative arrangement was arrived at empirically and proceeded along the following experimental lines, with the known facts as a. At a particular frequency, increasing the tap position as shown up towards the main tuning capacitor 30 along the coaxial line reduces the loaded Q of the cavity.

b. Increasing the series inductance of the choke 42 increases the loaded Q of the cavity.

The loaded Q values required are defined by the design of the multipole filter and the requirements imposed by out-of-band rejection and passband insertion loss.

They are determined by the value of the series inductance 42 and the tap position 40. We have found that at any two frequencies (30 MHz and 76 MHz) by a process of iteration, there was a value of inductance and a tap position for any two loaded Q numbers.

The step-by-step procedure to obtain this is as follows:

a. Select an inductance value arbitrarily and set the tap position 40 so that a loaded Q of 160 at 30 MHz. is obtained.

b. Go to 76 MHz and measure the loaded Q. Two things can occur in general, the loaded Q is higher than desired or it is lower.

If it is higher than desired, then there is too much inductance 42 in the circuit, if it is lower than desired, then there is not enough inductance.

Suppose it is higher, say 260 instead of 220 desired, then take out a little inductance, this lowers the loaded Q of the cavity, but it is known that if one goes back to 30 MHz, due to this lowering of the series inductance, the Q will measure too low. Therefore, one must offset this by lowering the tap point as well. Both these actions are done and the Q set to 220 at 76 MHz.

c. Returning to 30 MHz one finds the Q is too high, say 170. Having lowered the tap point in $b$ which tended to raise the loaded Q and reduced inductance tending to lower the loaded Q the tap point must be raised slightly. If we do that, we know that at 76 MHz the Q will not be too low, so that at the same time we must slightly increase the inductance.

With this procedure, one gradually homes in on the correct values at the band extremes.

In practice the choke 42 can be wound on a former and adjusted by means of the brass slug 44. The tap can also be adjustable. When the desired Q's at the end points are obtained these values are then fixed and can be of permanent magnitude and location. The empirical process for determining the exact magnitude of the choke 42 and the position of the hard point 40 can be eliminated in a production run since these values, once determined, will have a fixed magnitude and relationship.

It was found that the cooperative arrangement illustrated in FIG. 2 operated best when the inductance axis of the choke 42 was disposed radially to the inner conductor 32. Further, the slope of the characteristic curve can be varied over interesting and possibly useful ranges such as the essentially flat response shown by the solid line 23 of FIG. 4.

A precise theory has not been formulated. However, referring to FIGS. 6 and 7 the key formulas which appear to form the generalized idea behind the invention are:

$$R_p' = R_s(Q^2 = 1) \text{ where } Q = \omega L/R_s.$$

A typical value of the magnitude of the generator source $R_s$ is 50 ohms. $L$ is the magnitude of the choke 42 and $\omega$ is the input frequency in radians. The Q of the coupling loop transforms the source impedance $R_s$ to a resistance value $R_p'$ at the input resistance line located at the tap 40.

$R_p'$ represents the magnitude of the resistance which actually appears across the tap point 40. A cavity equivalent circuit resistance $R_a$ is equal to the parallel resistance loading across a lossless cavity and can be represented by $$1/R_a = 1/R_p' \sin^2 \theta_1$$

where $\theta_1$ is the electrical length in radians of the distance of the tap point up the quarter wavelength resonator from the grounded end.

Figure 6:
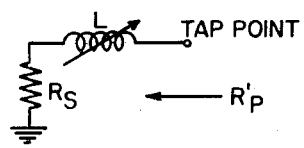
FIGS. 6 and 7 are electrical schematics of the illustrative embodiment.
Figure 7:
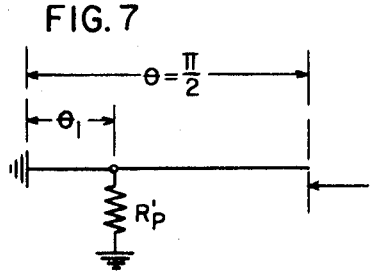

FIG. 6 illustrates the electrical equivalency of the combination of FIG. 2. The source impedance $R_s$ identified in FIG. 6 is serially connected with a variable inductance as determined by the magnitude of the choke 42 for connection to a tap point in the inner conductor.

Figure 5:
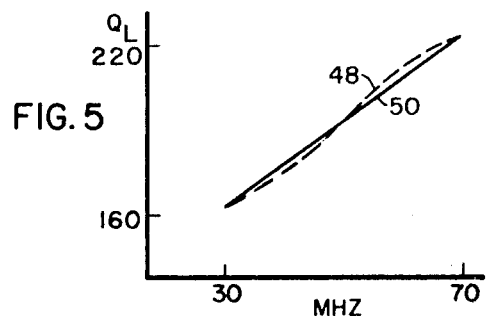
FIG. 5 is a graphical illustration of characteristics actually measured when practicing the present invention.

The theory of operation of the present invention is not completely defined at this time. In practice a network configuration was established as shown in FIG. 2 and was determined to provide a substantially linear relationship between the loaded Q of the input cavity and the frequency range of interest as demonstrated in FIG. 5. The dotted line 48 shows the actual measurements while the solid line 50 illustrates the desired linear relationship. For all practical purposes the combination of elements as shown in FIG. 2 provided the desired linear relationship.

In summary, the theory has not been deduced, but in practice a network configuration was established and shown to have a good application in the VHF frequency range for the type of filter required.

While the present invention has been described with a degree of particularity for the purposes of illustration, it is to be understood that all modifications, substitutions and alterations within the spirit and scope are herein meant to be included.

We claim as our invention:

1. In a resonant cavity, the combination comprising; an inner conductor, end loaded by a variable capacitor to obtain resonance over a wide range of frequencies; and input means for connecting a generator to said cavity for supplying an input signal; said input means including a coil and a tap connecting said coil to said inner conductor to complete a loop coupling to the cavity from the generator, said coil being of an inductive magnitude and said tap position on said conductor being selected to provide a relationship between the loaded Q of the cavity and the frequencies to which the cavity is to be tuned by the end-loading variable tuning capacitor which is substantially linear.

2. The combination of claim 1 wherein said coil is disposed on an axis which lies radially with respect to said inner conductor.

3. The apparatus of claim 1 wherein said coil is located within said cavity.

4. The combination of claim 4 wherein the inductance of said coil is variable.

5. The combination of claim 4 wherein said variable coil includes a former on which said coil is wound and a tuning slug, the position of which is adjustable to vary the magnitude of the inductance of said coil.

6. A channel filter comprising in combination; a plurality of cavities each consisting of an inner conductor of shortened length transmission line variably capacitively loaded at one end to obtain a wide range of frequencies; output means connected to the last cavity; means for interconnecting said plurality of cavities; input means for the first cavity including a choke and a tap for connecting said choke to said inner conductor; means for connecting said choke to a generator external to said cavity; the magnitude of the inductance of said choke and the position of the tap on said inner conductor being selected to provide a first predetermined loaded Q of the first cavity at a first frequency and a second predetermined loaded Q of the cavity at a second frequency, whereby the loaded Q of the cavity varies substantially linearly in the frequency range between said first and second frequency.

7. The combination of claim 6 wherein the first and second frequencies are at opposite extremes of the frequency range of interest.

* * * * *